US012096548B2

(12) United States Patent
Tam et al.

(10) Patent No.: US 12,096,548 B2
(45) Date of Patent: Sep. 17, 2024

(54) DRIFT TUBE ELECTRODE ARRANGEMENT HAVING DIRECT CURRENT OPTICS

(71) Applicant: Applied Materials, Inc., Santa Clara, CA (US)

(72) Inventors: Wai-Ming Tam, Manchester-by-the-Sea, MA (US); Klaus Becker, Kensington, NH (US); William Herron Park, Jr., Marblehead, MA (US); Frank Sinclair, Hartland, ME (US)

(73) Assignee: Applied Materials, Inc., Santa Clara, CA (US)

(*) Notice: Subject to any disclaimer, the term of this patent is extended or adjusted under 35 U.S.C. 154(b) by 67 days.

(21) Appl. No.: 17/949,862

(22) Filed: Sep. 21, 2022

(65) Prior Publication Data

US 2024/0098871 A1 Mar. 21, 2024

(51) Int. Cl.
*H05H 7/22* (2006.01)
*H05H 7/02* (2006.01)

(52) U.S. Cl.
CPC ................ *H05H 7/22* (2013.01); *H05H 7/02* (2013.01); *H05H 2007/025* (2013.01); *H05H 2007/222* (2013.01)

(58) Field of Classification Search
CPC ............... H01J 37/3007; H01J 37/3171; H01J 37/32082; H01J 37/32247; H01J 2237/04735; H05H 9/041; H05H 2277/12
See application file for complete search history.

(56) References Cited

U.S. PATENT DOCUMENTS

| | | | | |
|---|---|---|---|---|
| 6,208,095 | B1 * | 3/2001 | DiVergilio | H05H 7/18 315/505 |
| 6,583,429 | B2 | 6/2003 | Saadatmand et al. | |
| 2009/0206270 | A1 * | 8/2009 | Glayish | H01J 37/05 250/492.1 |
| 2019/0371562 | A1 * | 12/2019 | Sinclair | H01J 37/04 |
| 2020/0066486 | A1 * | 2/2020 | Sinclair | H01J 37/3007 |
| 2020/0357603 | A1 * | 11/2020 | Sinclair | H01J 37/3171 |

(Continued)

FOREIGN PATENT DOCUMENTS

KR 20180007703 A 1/2018

OTHER PUBLICATIONS

Otis & Damm, "Drift Tube Quadrupoles", IEEE Trans. Nucl. Sci. PAC 1967 report, p. 420-424.

(Continued)

*Primary Examiner* — Raymond R Chai
(74) *Attorney, Agent, or Firm* — KDW Firm PLLC

(57) ABSTRACT

An apparatus may include a drift tube assembly having a plurality of drift tubes to conduct an ion beam along a beam propagation direction. The plurality of drift tubes may define a multi-gap configuration corresponding to a plurality of acceleration gaps, wherein at least one powered drift tube of the drift tube assembly is coupled to receive an RF voltage signal. The apparatus may also include a DC electrode assembly that includes a conductor line, arranged within a resonator coil that is coupled to receive a DC voltage signal into the at least one powered drift tube. The DC electrode assembly may also include a DC electrode arrangement, connected to the conductor line and disposed within the at least one powered drift tube.

19 Claims, 8 Drawing Sheets

(56) References Cited

U.S. PATENT DOCUMENTS

2022/0174810 A1* 6/2022 Biloiu ...................... H05H 7/22
2024/0098871 A1* 3/2024 Tam ....................... H05H 7/001

OTHER PUBLICATIONS

G. W. Wheeler, T K. Batchelor, R. Chasman, P. Grand And J. Sheehan, "The Brookhaven 200-Mev Proton Linear Accelerator" Particle Accelerators 1979, vol. 9, pp. 1-156.
Holsinger et al., "The Drift Tube and Beam Line Quadrupole Permanent Magnets for the Nen Proton Linac", Proc. 1979 Accelerator Conference PAC 1979 report, p. 373-379.
Y.H. Kim, H.J. Kwon, and Y.S. Cho, "Drift tube with an electro-quadrupole magnet made with a conventional enamel wire for the proton engineering frontier project drift tube linac", Nuclear Instruments and Methods in Physics Research A 569 (2006) 671-676.
Wikipedia https://en.wikipedia.org/wiki/Th%C3%A9venin%27s_theorem; downloaded 6 pages.
International Search Report and Written Opinion for Application No. PCT/US2023/033256 dated Jan. 5, 2024.

* cited by examiner

DRIFT TUBE ELECTRODE ARRANGEMENT HAVING DIRECT CURRENT OPTICS

FIELD OF THE DISCLOSURE

The disclosure relates generally to ion implantation apparatus and more particularly to high energy beamline ion implanters.

BACKGROUND OF THE DISCLOSURE

Ion implantation is a process of introducing dopants or impurities into a substrate via bombardment. Ion implantation systems may comprise an ion source and a series of beam-line components. The ion source may comprise a chamber where ions are generated. The ion source may also comprise a power source and an extraction electrode assembly disposed near the chamber. The beam-line components, may include, for example, a mass analyzer, a first acceleration or deceleration stage, a collimator, and a second acceleration or deceleration stage. Much like a series of optical lenses for manipulating a light beam, the beam-line components can filter, focus, and manipulate ions or ion beam having particular species, shape, energy, and/or other qualities. The ion beam passes through the beam-line components and may be directed toward a substrate mounted on a platen or clamp.

Implantation apparatus capable of generating ion energies of approximately 1 MeV or greater are often referred to as high energy ion implanters, or high energy ion implantation systems. One type of high energy ion implanter is termed linear accelerator, or LINAC, where a series of electrodes arranged as tubes conduct and accelerate the ion beam to increasingly higher energy along the succession of tubes, where the electrodes receive an powered voltage signal. Known LINACs are driven by an RF voltage of frequency in the 10 MHz-120 MHz range, with many using 13.56 MHz and its harmonics, which frequencies have special permission for industrial, scientific and medical (ISM) usage by the Federal Communication Commission (FCC). A given stage of a linear accelerator is driven by an assembly of RF electrodes (a drift tube assembly) that are arranged as hollow tubes to conduct the ion beam therethrough, where acceleration of the ion beam takes place in gaps between adjacent electrodes of the drift tube assembly.

One issue for operation of RF LINAC ion implanters is that during acceleration of an ion beam, which ion beam is partitioned into ion bunches along a direction of propagation (Z-direction), a natural tendency of an ion bunch is to spread out both transversely (in X-direction and Y-direction) as well as longitudinally (in Z-direction, or equivalently, in time). Thus, besides accelerating an ion beam, a LINAC also has to focus the ion beam to maintain a small lateral dimension that will propagate down the beam 'pipeline' without losing ions to the sidewalls. Traditionally this focusing is performed by inserting direct current (DC) quadrupole elements between the acceleration stages. Such quadrupoles may be electromagnetic or electrostatic, while electrostatic quadrupoles are used more often because of compactness, lower cost and the ability to perform almost as well at the energies used in semiconductor processing (<20 MeV). These quadrupoles are often equipped with more than one power supply, allowing them to do double duty as steering elements used to correct for minor sideways deflection of the beam. Because the quadrupoles require extra spacing between adjacent acceleration stages, the inserting of quadrupoles into a LINAC increases the minimum length required for the beamline. As a result, the footprint of the ion implanter is increased, and the ability to transport drift beams (that are not accelerated by the RF fields) through the LINAC is limited.

One approach for reducing the length of the overall linear accelerator involves adding a magnetic quadrupole within a drift tube electrode. This approach is limited to a pulsed beam and a relatively low duty cycle. In ion implantation applications, continuous wave (CW) operation is required, where providing water cooling for electromagnets inside the drift tubes presents a significant challenge. Other approaches employ permanent magnet quadrupoles, which arrangements are relatively bulky.

With respect to these and other considerations the present disclosure is provided.

BRIEF SUMMARY

In one embodiment, an apparatus is provided. The apparatus may include a drift tube assembly having a plurality of drift tubes to conduct an ion beam along a beam propagation direction. The plurality of drift tubes may define a multi-gap configuration corresponding to a plurality of acceleration gaps, wherein at least one powered drift tube of the drift tube assembly is coupled to receive an RF voltage signal. The apparatus may also include a DC electrode assembly that includes a conductor line, arranged within a resonator coil that is coupled to receive a DC voltage signal into the at least one powered drift tube. The DC electrode assembly may also include a DC electrode arrangement, connected to the conductor line and disposed within the at least one powered drift tube.

In another embodiment, a linear accelerator may include a plurality of acceleration stages. At least one acceleration stage of the plurality of acceleration stages may include a drift tube assembly, to conduct an ion beam along a beam propagation direction. The acceleration stage may also include a resonator coil that has a conductive wall that is coupled to deliver an RF voltage to a powered drift tube of the drift tube assembly. The acceleration stage may also include a DC electrode assembly that includes a conductor line, arranged within the resonator coil, and electrically isolated from the resonator coil. The DC electrode assembly may also include a DC electrode arrangement, connected to the conductor line and disposed within the at least one powered drift tube, and electrically isolated from the at least one powered drift tube.

In a further embodiment, an ion implanter may include an ion source, to generate an ion beam; and a linear accelerator, disposed to receive the ion beam. The linear accelerator may include a plurality of acceleration stages, wherein at least one acceleration stage of the plurality of acceleration stages comprises a drift tube assembly, to conduct an ion beam along a beam propagation direction. The acceleration stage may also include a resonator coil that has a conductive wall that is coupled to deliver an RF voltage to a powered drift tube of the drift tube assembly, and may further include a DC electrode assembly. The DC electrode assembly may include a conductor line, arranged within the resonator coil, and electrically isolated from the resonator coil, and may also include a DC electrode arrangement, connected to the conductor line and disposed within the at least one powered drift tube, and electrically isolated from the at least one powered drift tube.

Figure 1A:
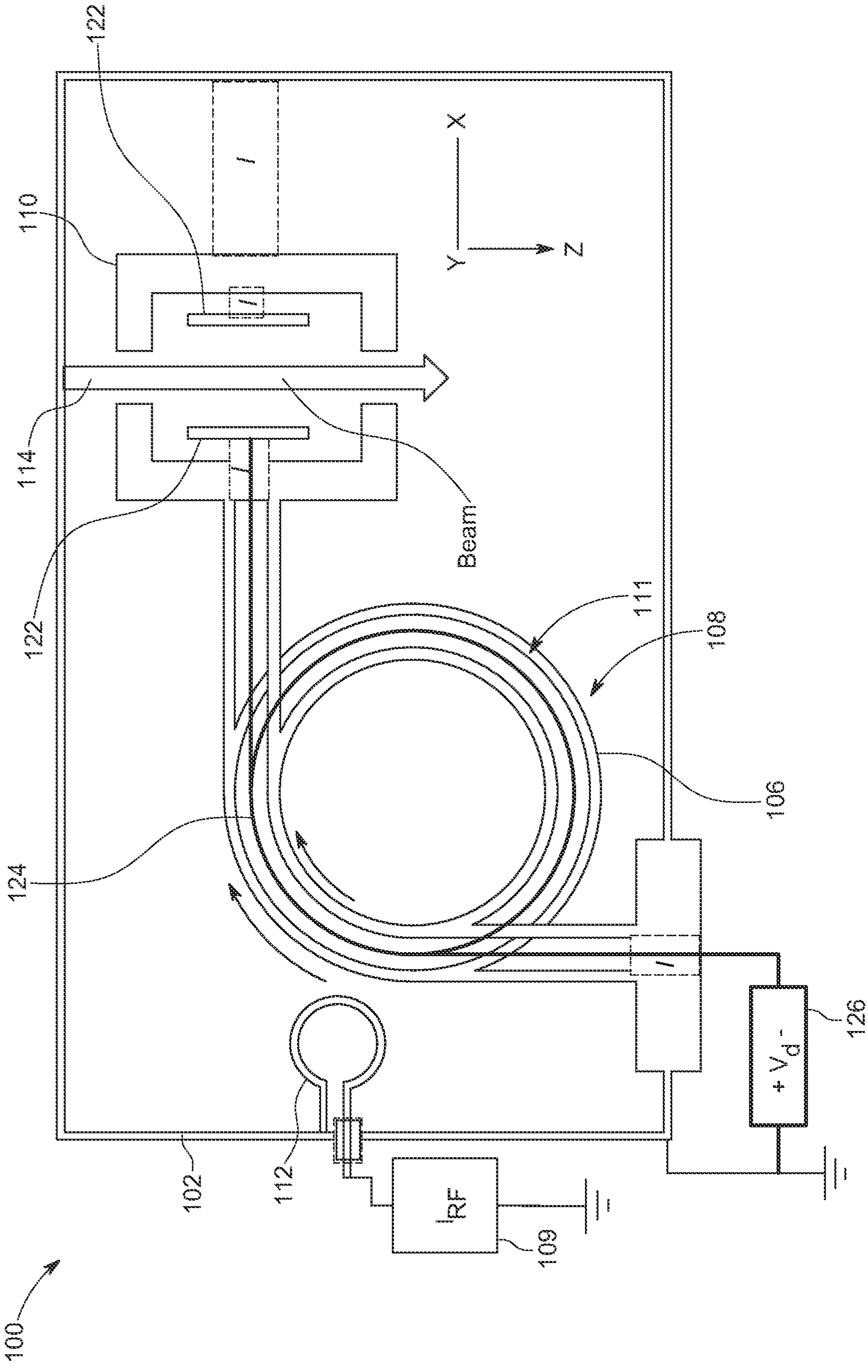
FIG. 1A shows a longitudinal sectional view of an apparatus, according to embodiments of the disclosure.

The drawings are not necessarily to scale. The drawings are merely representations, not intended to portray specific parameters of the disclosure. The drawings are intended to depict exemplary embodiments of the disclosure, and therefore are not be considered as limiting in scope. In the drawings, like numbering represents like elements.

DETAILED DESCRIPTION

An apparatus, system and method in accordance with the present disclosure will now be described more fully hereinafter with reference to the accompanying drawings, where embodiments of the system and method are shown. The system and method may be embodied in many different forms and are not be construed as being limited to the embodiments set forth herein. Instead, these embodiments are provided so this disclosure will be thorough and complete, and will fully convey the scope of the system and method to those skilled in the art.

Terms such as "top," "bottom," "upper," "lower," "vertical," "horizontal," "lateral," and "longitudinal" may be used herein to describe the relative placement and orientation of these components and their constituent parts, with respect to the geometry and orientation of a component of a semiconductor manufacturing device as appearing in the figures. The terminology may include the words specifically mentioned, derivatives thereof, and words of similar import.

As used herein, an element or operation recited in the singular and proceeded with the word "a" or "an" are understood as potentially including plural elements or operations as well. Furthermore, references to "one embodiment" of the present disclosure are not intended to be interpreted as precluding the existence of additional embodiments also incorporating the recited features.

Provided herein are approaches for improved high energy ion implantation systems and components, based upon a beamline architecture, and in particular, ion implanters based upon linear accelerators. For brevity, an ion implantation system may also be referred to herein as an "ion implanter." Various embodiments entail novel approaches that provide the capability of improved control of an ion beam during acceleration through the acceleration stages of a linear accelerator, and in particular, improved ion beam focusing.

Various embodiments of the disclosure are related to a novel architecture for drift tube assemblies in a linear accelerator (LINAC), and in particular, for linear accelerators used to accelerate ion beams in a beam line ion implanter. In various embodiments, a given acceleration stage of a LINAC may be provided with a drift tube assembly that includes a plurality of drift tubes to conduct an ion beam along a beam propagation direction. The drift tube assembly is equipped with at least one powered drift tube that is coupled to receive an RF voltage signal. Together with grounded drift tubes, the drift tube assembly defines a plurality of acceleration gaps to accelerate the ion beam.

In the present embodiments, a configuration of inner electrode(s) is provided within one or more powered drift tubes of a drift tube assembly, where the configuration of electrodes may be referred to as "DC optics" to denote that the inner electrode provides a static (DC) electric field within the drift tube. In particular, as detailed below, a DC electrode assembly may be provided that includes a conductor line, arranged within a resonator coil that is coupled to deliver RF voltage signal a powered drift tube, as well as a DC electrode arrangement (DC optics) that is connected to the conductor line and is disposed within the powered drift tube.

FIG. 1A shows an exemplary apparatus according to embodiments of the disclosure. The apparatus 100 may represent an acceleration stage of a linear accelerator, such as a linear accelerator arranged within an ion implanter. The apparatus 100 may include a first powered drift tube 110 that forms part of a drift tube assembly 150 of an acceleration stage, as depicted in FIG. 1D. More particularly the drift tube assembly 150 may be formed of hollow cylinders that conduct an ion beam in the cavities formed by the hollow cylinders. In particular, the drift tube assembly 150 defines a triple gap configuration, where an ion beam is conducted through three accelerating gaps, shown as G1, G2, and G3. As such, the drift tube assembly 150 is arranged to transmit and accelerate a bunched ion beam, shown as an ion beam 170, along a beam path that extends through the hollow cylinders and parallel to the Z-axis of the Cartesian coordinate system shown.

The drift tube assembly 150 is formed of a plurality of drift tubes, including a first grounded drift tube 160, a second grounded drift tube 180, a first powered drift tube 110, disposed downstream of the first grounded drift tube 160, and a second powered drift tube 110A, disposed downstream of the first powered drift tube 110. It may be understood that the drift tube assembly 150 is coupled to a resonator (shown as resonator 108 in FIG. 1A), where the resonator 108 is arranged to output an RF signal.

In the configuration of FIG. 1D it may be understood that opposite ends of a given resonator that includes two resonator coils are to be connected to the first powered drift tube 110, and the second powered drift tube 110A. Accordingly, when an RF power generator 109 delivers RF power to the resonator, an RF signal is generated at the first powered drift tube 110 and at the second powered drift tube 110. The generated RF voltages have sinusoidal temporal variation and may have a phase difference of 180 degrees, which variation means the voltage on the first powered drift tube 110 is equal but opposite polarity as the voltage on the second powered drift tube 110A. A sinusoidal time-varying electric field thus develops across gap G2, and varying according to the frequency of the applied RF voltage signal. Likewise, time-varying electric fields of the same frequency but having different amplitude develops across gap G1, between the first grounded drift tube 160 and first powered drift tube 110, and across the gap G3, between the second powered drift tube 110A and second grounded drift tube 180.

Figure 1B:
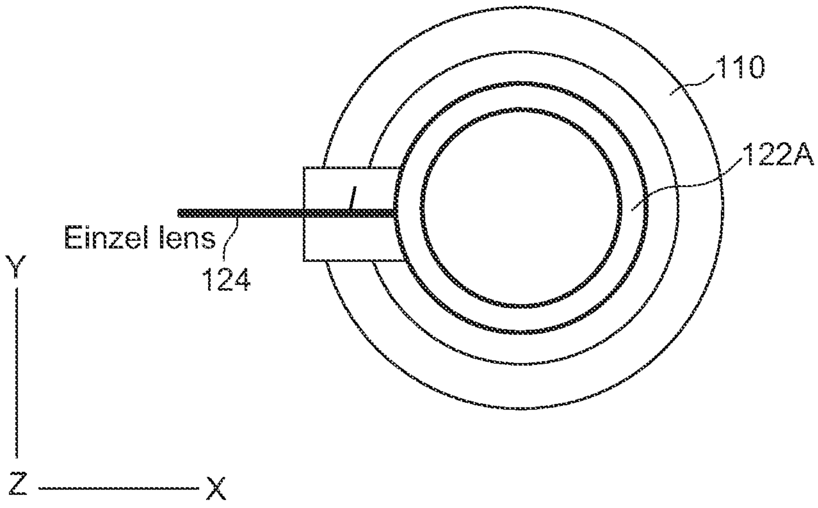
FIG. 1B shows a transverse view of a portion of the apparatus of FIG. 1A according to one variant.
Figure 1C:
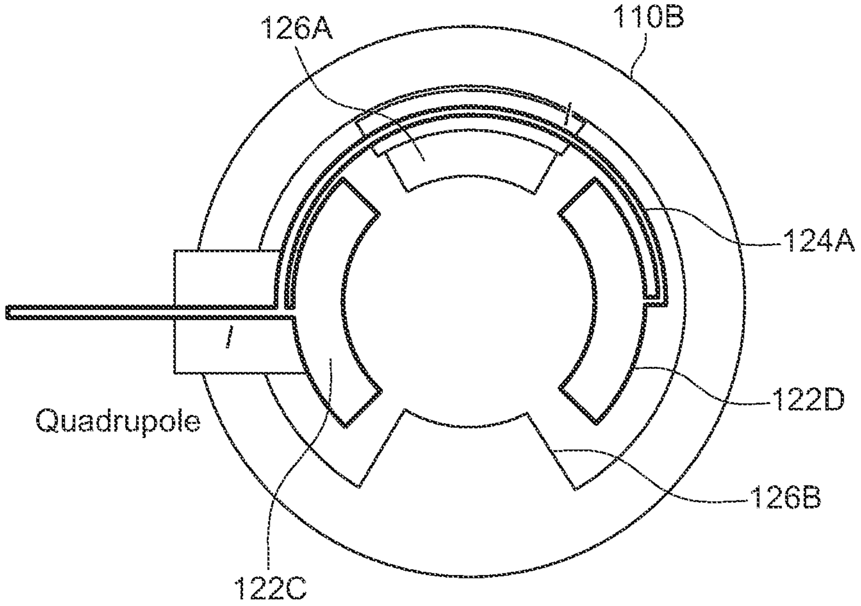
FIG. 1C shows a transverse view of a portion of the apparatus of FIG. 1A according to another variant.
Figure 1D:
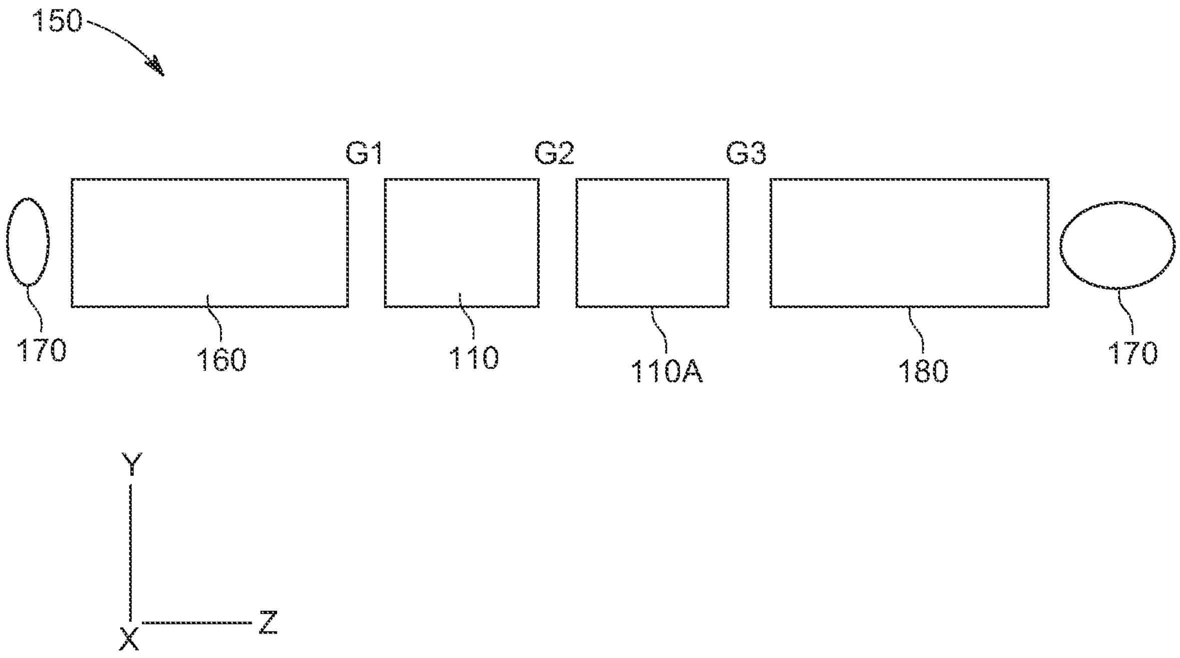
FIG. 1D shows a side view of an exemplary drift tube assembly, according to embodiments of the disclosure.
Figure 1E:
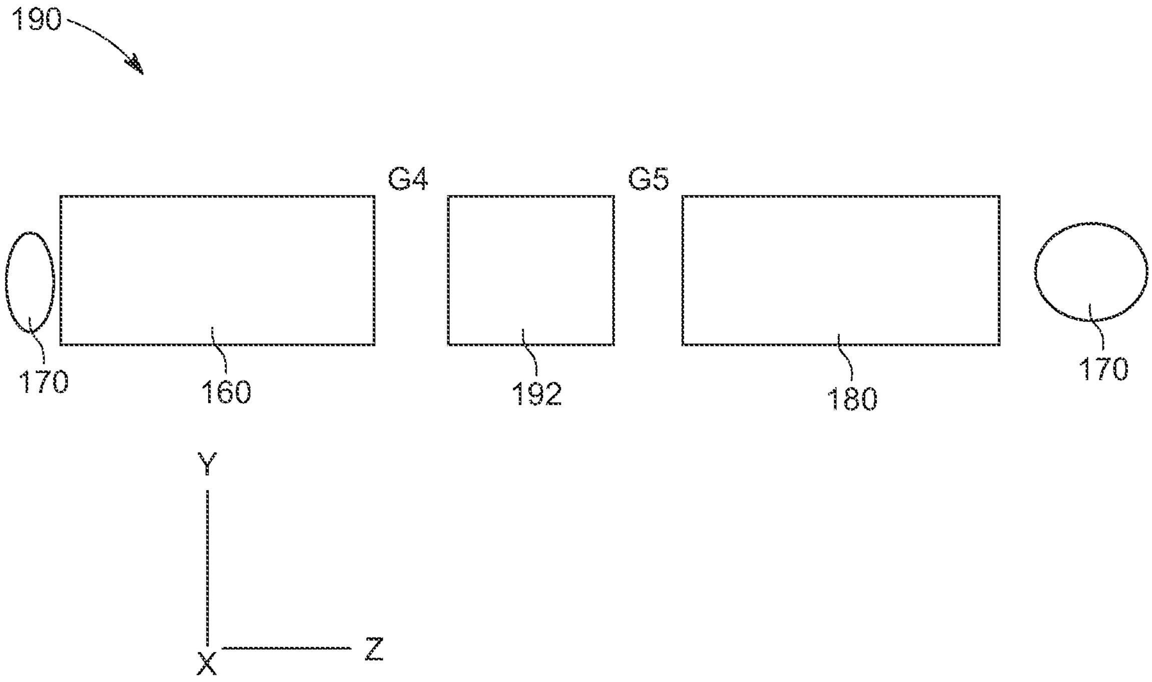
FIG. 1E shows a side view of additional exemplary drift tube assembly, according to embodiments of the disclosure.

Turning to FIG. 1E, there is shown a drift tube assembly 190, arranged in a double gap configuration that defines a gap G4 between the first grounded drift tube 160 and a first powered drift tube 192, and a gap G5, between the first powered drift tube 192 and second grounded drift tube 180 It may be understood that the drift tube assembly 190 is also coupled to a resonator (shown as resonator 108 in FIG. 1A), where the resonator 108 is arranged to output an RF signal. In the configuration of FIG. 1E it may be understood that a single resonator coil is to be connected to the first powered drift tube 192, and the second powered drift tube 110A. Accordingly, time-varying electric fields of the same frequency but same amplitude may develop over the gap G4, between the first grounded drift tube and first powered drift tube 192, and across the gap G5, between the first powered drift tube 192 and second grounded drift tube 180.

Returning to FIG. 1A, the apparatus 100 includes, in addition to a first powered drift tube 110, a resonator 108 within an enclosure 102 that is coupled to deliver an RF voltage signal to the first powered drift tube 110, described above. It may be understood that the first powered drift tube 110 forms part of a drift tube assembly that includes a plurality of drift tubes to conduct an ion beam along a beam propagation direction, where the plurality of drift tubes define a multi-gap configuration as detailed with respect to the triple gap embodiment of FIG. 1D or the double gap embodiment of FIG. 1E. The apparatus 100 includes an RF power generator 109, that is connected to an exciter coil 112, where the exciter coil 112 delivers RF power to a resonator coil 106 that is electrically conductively connected to the first powered drift tube 110. The resonator coil 106 may be formed as a hollow tube that has a conductive wall 111 arranged to deliver the RF voltage signal to the first powered drift tube 110. The apparatus 100 also includes a DC electrode assembly that includes a conductor line 124, arranged within the resonator coil 106. The conductor line 124 may be any suitable electrical conductor, including a wire or other conductive structure, and is electrically isolated from the resonator coil 106, such as through insulator structures, shown as I in FIG. 1A. The apparatus 100 further includes a DC electrode arrangement 122, connected to the conductor line 124, and disposed within the first powered drift tube 110, and also electrically isolated from the first powered drift tube 110.

The conductor line 124 is coupled to receive a DC voltage from a DC voltage source 126, and as explained with respect to the figures to follow, may accordingly generate a DC electric field within the first powered drift tube 110. As detailed below, the DC electric field will arise between a given DC electrode of the DC electrode arrangement 122, and a wall of the first powered drift tube 110.

Turning to FIG. 1B, there is shown a variant of the embodiment of FIG. 1A, where the DC electrode arrangement 122 comprises an Einzel lens configuration. This variant is shown as DC electrode arrangement 122A, where a central electrode has a shape of a hollow cylinder, as in known Einzel lenses. Note that in the configuration of FIG. 1A, in one implementation, the walls of the first powered drift tube 110 may also form part of an Einzel lens configuration with the DC electrode arrangement 122.

In other embodiments, the DC electrode arrangement 122 may be arranged as a quadrupole configuration, as shown in FIG. 1C. The quadrupole configuration of FIG. 1C includes a pair of DC electrodes, shown as electrode 122C and electrode 122D, where these two electrodes are disposed opposite to one another within a first powered drift tube 110B. The electrode 122C and electrode 122D are coupled to a conductive line that is shown as conductor line 124A that may be fed through an insulator I arranged along a wall of a first powered drift tube 110B. To form a quadrupole configuration, a pair of protrusions may be provided that extend from an inner wall of the first powered drift tube 110B. A dipole steering configuration can also easily be constructed. However, other configurations are possible to establish an electric quadrupole.

Thus, a feature of the apparatus 100 is the ability to provide a DC field within a chamber formed by the first powered electrode 110. By appropriate selection of the type of configuration of the DC electrode arrangement 122, and by application of a suitable DC voltage, the apparatus 100 may focus, steer, or otherwise manipulate an ion beam 114 passing through the first powered drift tube 110. The manipulation of the ion beam 114 by the DC electrode arrangement 122 is performed in a manner that is independent from the acceleration of the ion beam 114 that is provided by RF voltage applied to the first powered drift tube 110 by the resonator 108.

Figure 2:
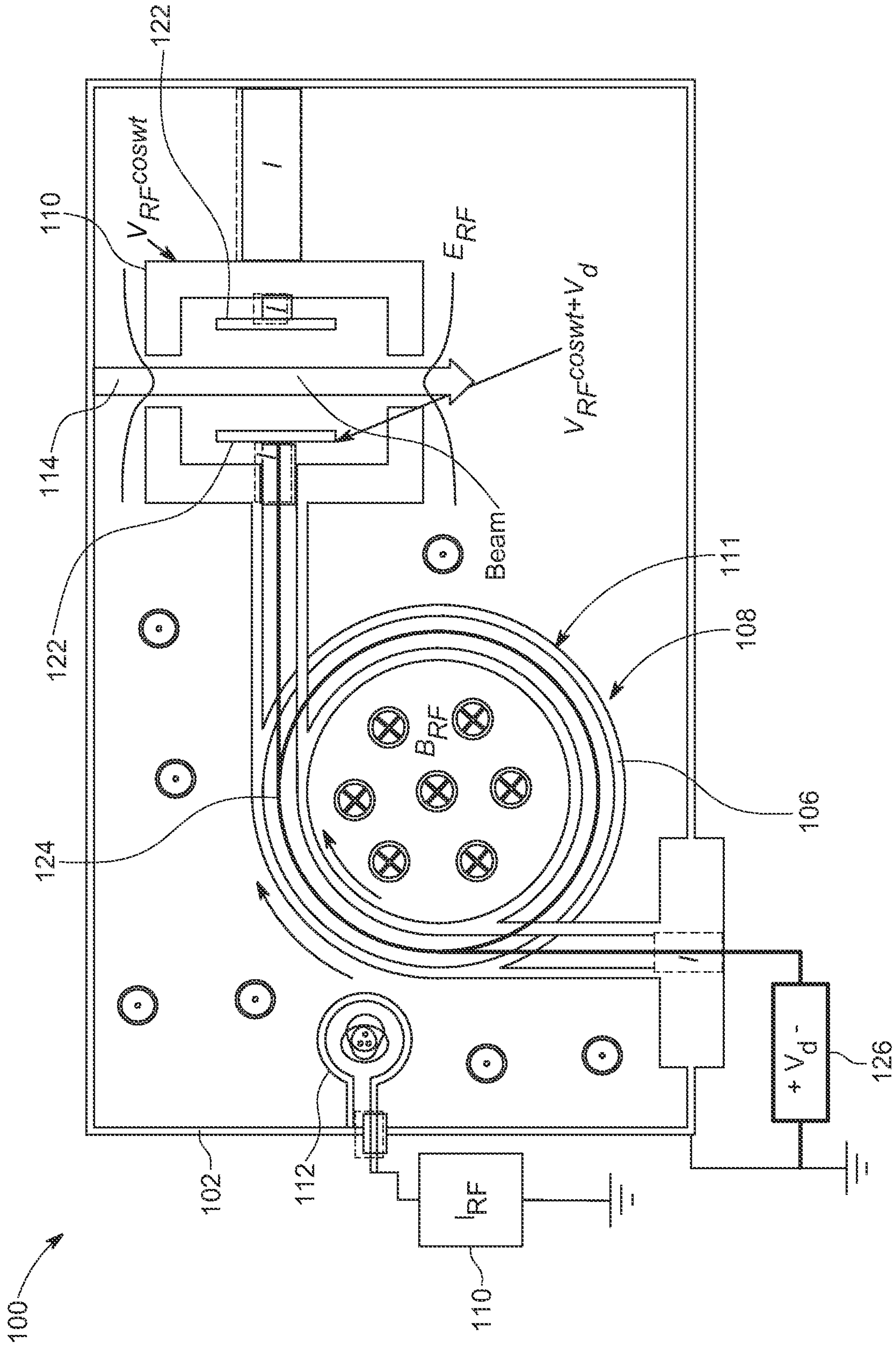
FIG. 2 shows an exemplary scenario during operation of the apparatus of FIG. 1A.

Turning to FIG. 2, to clarify the operation of the system, there is shown one scenario during the operation of the apparatus 100, according to embodiments of the disclosure. In this example, an RF current $I_{RF}$ is generated from the RF power supply 109 along an outside of the resonator coil 106, meaning along the external conductive walls of the resonator coil 106. This RF current flows at the rate of the RF signal generated by the RF power supply 109, which signal may in the range of 1 MHz to 100 MHz according to some non-limiting embodiments. As such, an RF magnetic field $B_{RF}$ is generated in the enclosure 102. In the scenario of FIG. 2, understanding that RF fields only penetrate conductors to a limited skin depth teaches that the RF electric fields $E_{RF}$ do not penetrate into the first powered drift tube 110. As such, a time varying voltage is generated at the first powered drift tube 110, meaning the walls of the first powered drift tube 110. This voltage is shown as $V_{RF}$ cos ωt, which voltage creates the time varying electric fields across a gap between adjacent drift tubes in a drift tube assembly that accelerates the ion beam (see gaps G1-G5 for the drift tube assemblies of FIGS. 1D-1E).

In addition, according to the embodiment of FIG. 2, an RF voltage also develops on the electrode assembly 122, which voltage is given by $V_{RF}$ cos ωt+$V_d$, where the parameter $V_d$ represents a DC voltage applied from the DC voltage source 126 over the conductor line 124. Note that this voltage varies in frequency and phase in synchronization with the voltage on the first powered drift tube 110. As a result, a DC voltage that is applied from a DC voltage source 126 appears with respect to the first powered drift tube 110 as a DC voltage even though the first powered drift tube 110 itself may be oscillating in potential at several MHz with a voltage of tens of kilovolts or more, in apparent contradiction to the known Thevenin theorem. In other words, the conductor line 124 is connected at one end to a DC voltage and yet at the same time at the other end of the conductor line 124 adjacent to the electrode arrangement 122 the conductor line 124 is oscillating at high voltage. The present inventors have further appreciated that the apparent violation may be overcome by understanding that Thevenin's theorem is only to be applied to DC circuits. This insight can be further understood by considering the application of Maxwell's equations to the scenarios illustrated in FIGS. 3 and 4.

Figure 3:
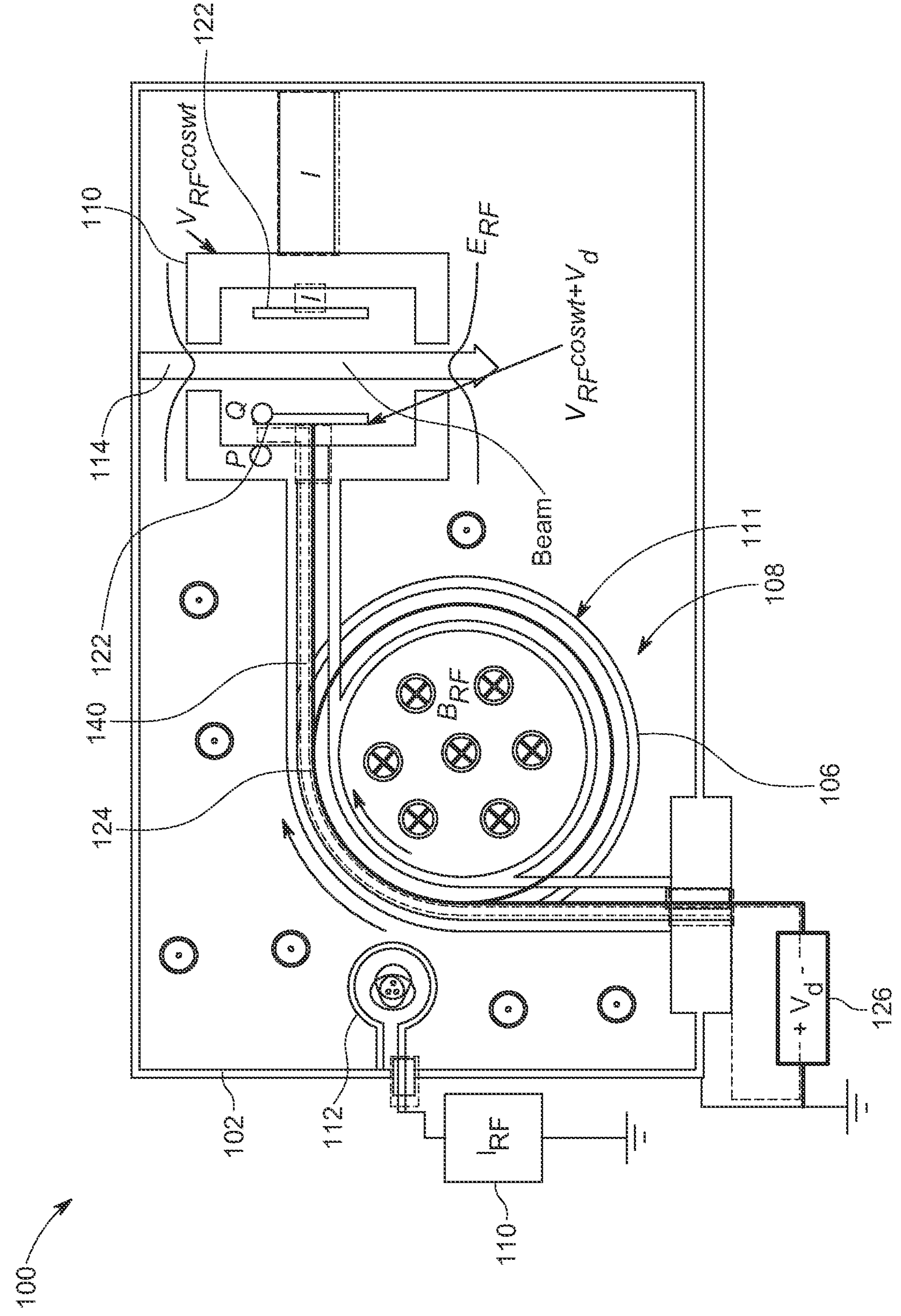
FIG. 3 shows the application of Stokes' theorem to the DC part of the apparatus during operation of the apparatus of FIG. 1A.

Turning to FIG. 3, there is shown one scenario during the operation of the apparatus 100, according to embodiments of the disclosure. In FIG. 3, a further analysis of the scenario of FIG. 2 is provided. Assuming that the scenario involves a sinusoidal field that is applied in a linear medium $$\nabla \times E = -i\omega B. \quad (1)$$

As a result, in accordance with Stoke's theorem $$\oint E \cdot dl = -\int_A i\omega B \cdot dA \quad (2)$$

If we consider a loop 140 that hugs the interior surface of the resonator coil and goes through the DC voltage source 126, no B field will pass through the loop 140. And therefore $$\oint E \cdot dl = 0 \quad (3),$$

such that the voltage Vd (which is a DC voltage) has to appear between the points P and Q of FIG. 3, meaning between an electrode of the DC electrode arrangement 122 and the inner wall of the first powered drift tube 110.

Figure 4:
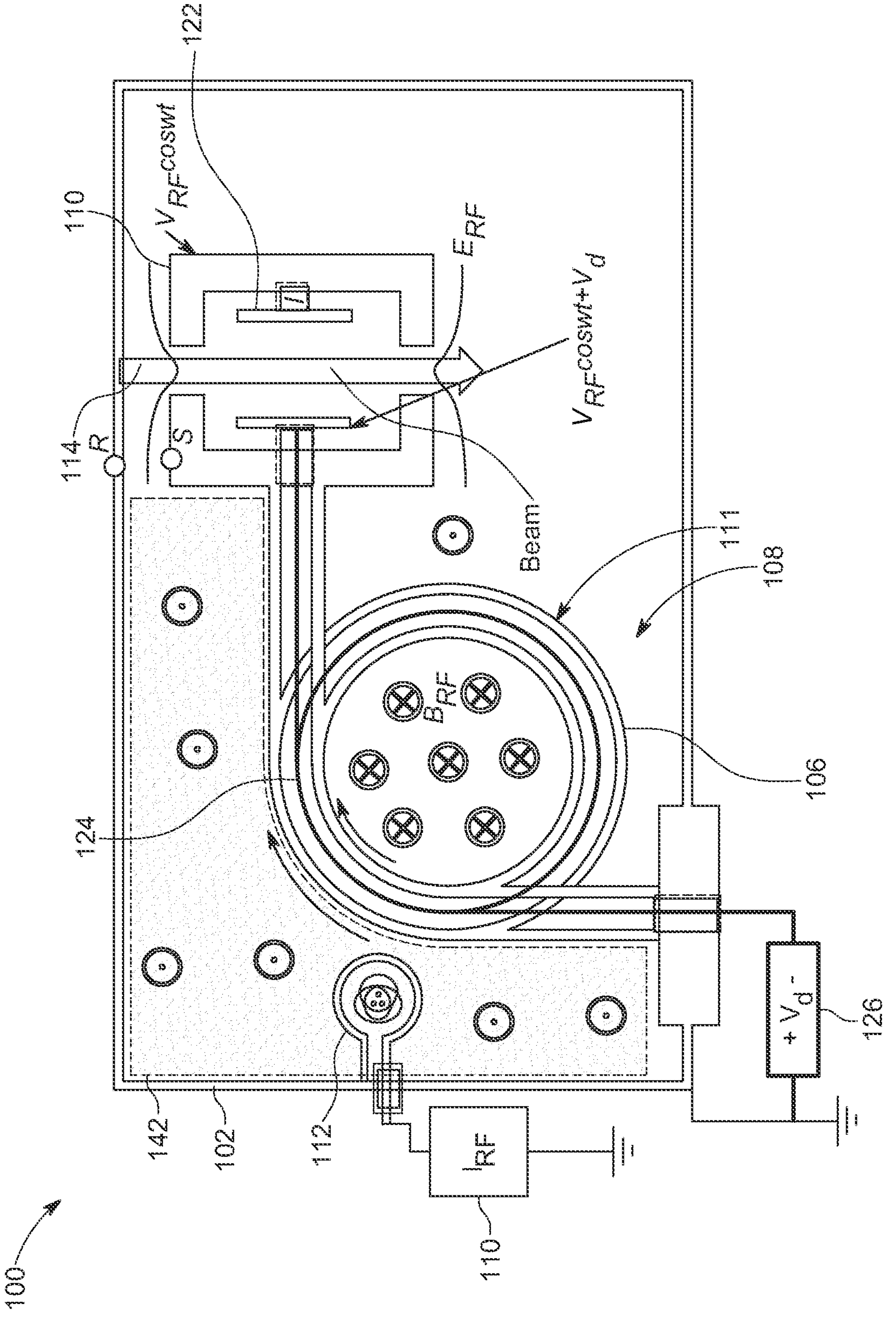
FIG. 4 shows the application of Stokes' theorem to the RF part of the apparatus during operation of the apparatus of FIG. 1A.

Turning to FIG. 4, there is shown one scenario during the operation of the apparatus 100, according to embodiments of the disclosure. In FIG. 4, a further analysis of the scenario of FIG. 2 is provided. If we consider a loop 142 that hugs the exterior surface of the resonator coil 106, and encloses the resonant B field, $$\oint E \cdot dl = \int_A i\omega B \cdot dA \quad (4).$$

In various embodiments the value of this parameter may in the range of tens of thousands of volts, and for example, ~100 $kV_{RF}$. Most of this voltage will appear between the points R and S in FIG. 4, which voltage is the equivalent of the oscillating RF voltage appearing between a grounded surface such as enclosure 102 and the first powered drift tube 110, including the voltage between a grounded drift tube (see, for example, grounded drift tube 160) and the first powered drift tube 110.

Figure 5:
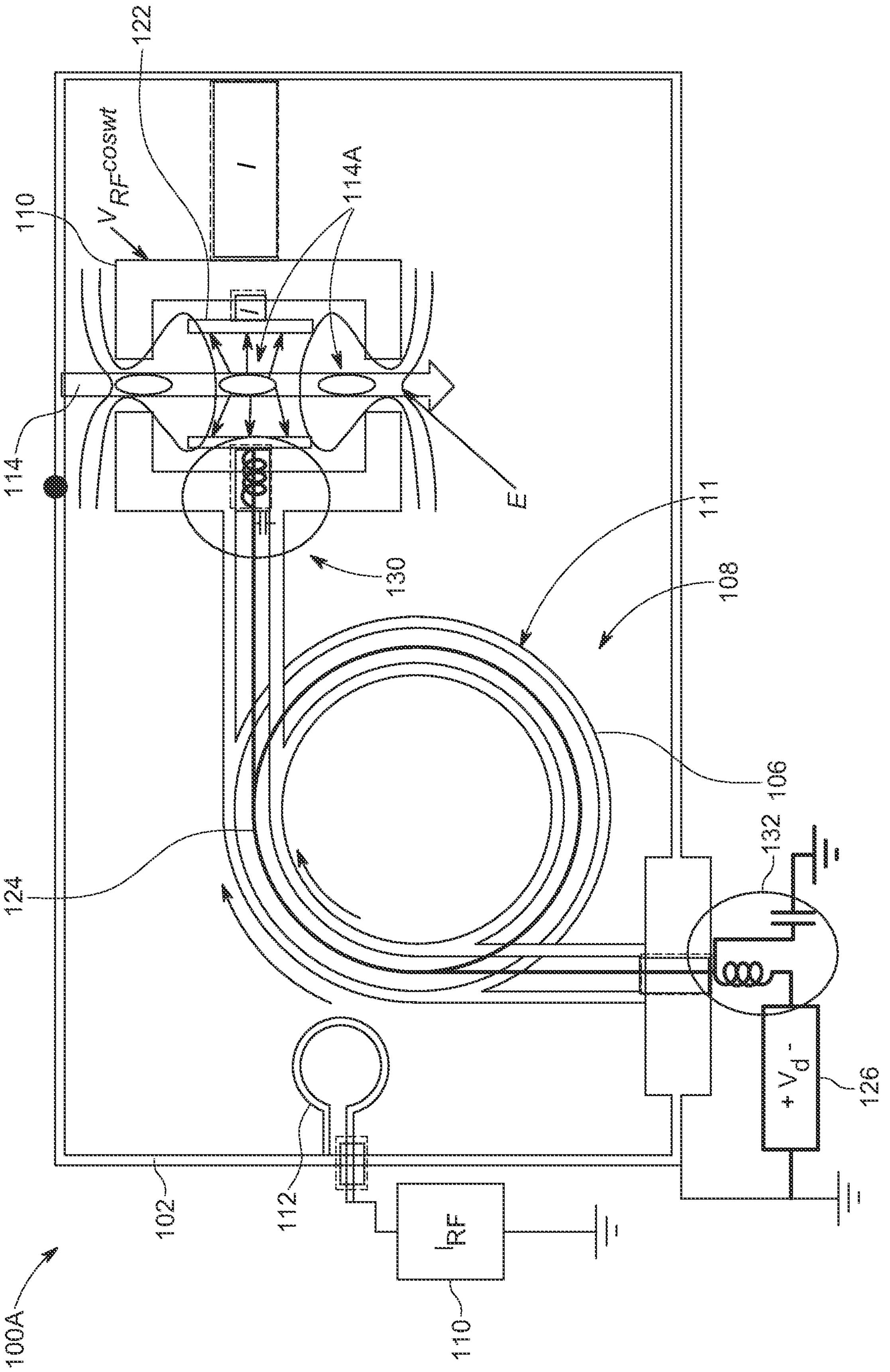
FIG. 5 shows a variant of the apparatus of FIG. 1A.

Turning to FIG. 5, there is shown one scenario during the operation of a variant of the apparatus 100, according to embodiments of the disclosure. In FIG. 5, a scenario for operation of an apparatus 100A is depicted where a small RF voltage may appear on electrodes inside of the first powered drift tube 110. This scenario may obtain when an electric field penetrates through entrance or exit apertures of the first powered drift tube 110, as depicted. The RF voltage may also appear on electrodes inside of the first powered drift tube 110 due to a bunched ion beam passing through the first powered drift tube 110. In other words, the ion beam bunches passing through the first powered drift tube 110 may generate space charge that tends to generate an RF voltage at the DC electrode arrangement. Note that the ion beam 114 in practice will traverse the first powered drift tube 110 as a series of bunches, as depicted in FIG. 5, rather than as continuous beam. In accordance with embodiments of the disclosure, a DC electrode assembly may further include an RF filter, disposed between the DC voltage source 126 and the DC electrode arrangement 122. One example of an RF filter is shown as the entrance filter 130, disposed at the entrance to the first powered drift tube 110. Another example, is the source filter 132, disposed at the connection to the DC voltage supply 126.

Figure 6:
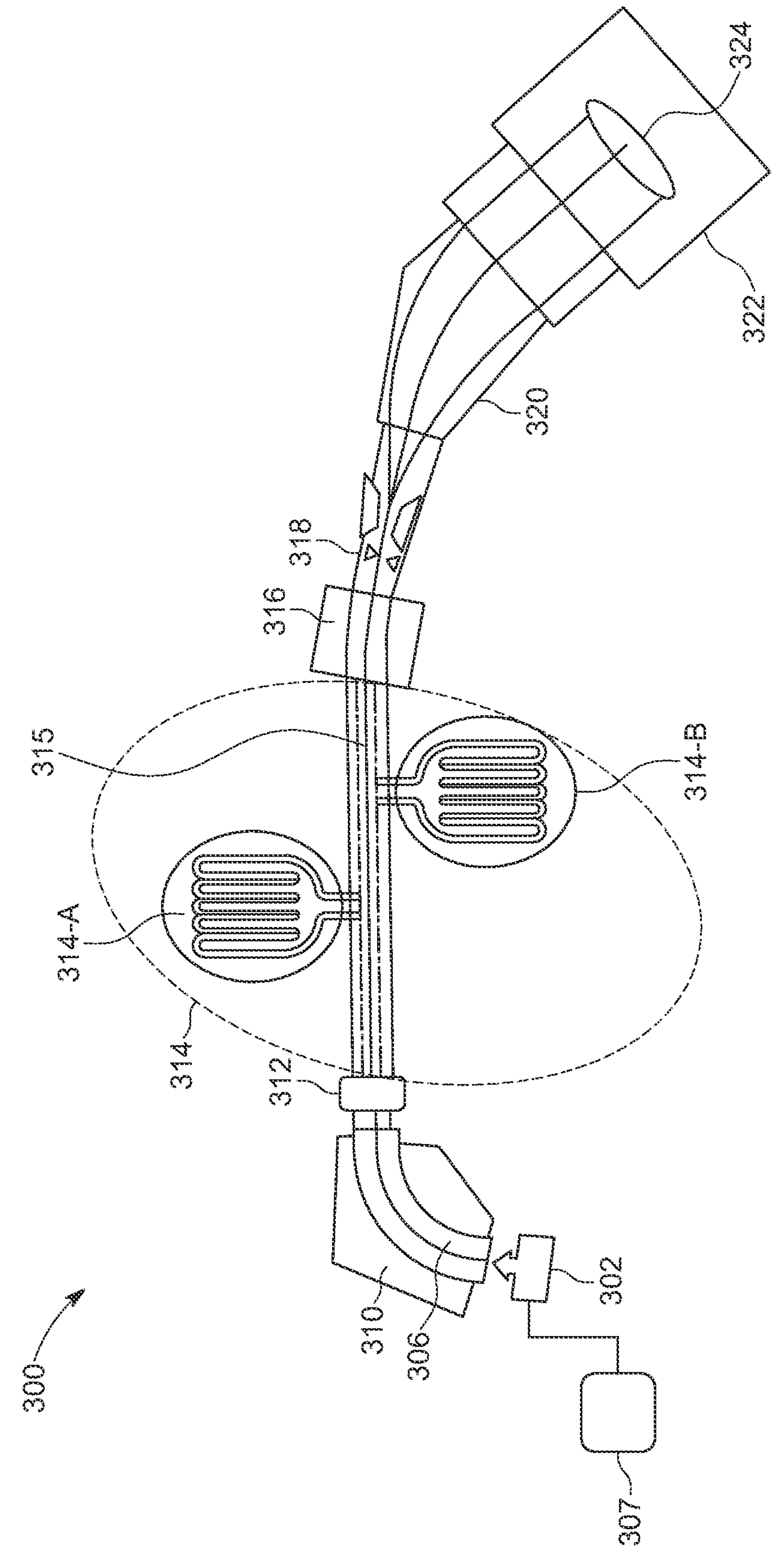
FIG. 6 depicts an exemplary ion implanter according to embodiments of the disclosure.

FIG. 6 depicts a schematic of an ion implanter, according to embodiments of the disclosure. The ion implanter 300 includes acceleration stages 314-A, 314-B of a LINAC, shown as linear accelerator 314. The ion implanter 300, may represent a beamline ion implanter, with some elements not shown for clarity of explanation. The ion implanter 300 may include an ion source 302, and a gas box 307 as known in the art. The ion source 302 may include an extraction system including extraction components and filters (not shown) to generate an ion beam 306 at a first energy. Examples of suitable ion energy for the first ion energy range from 5 keV to 100 keV, while the embodiments are not limited in this context. To form a high energy ion beam, the ion implanter 300 includes various additional components for accelerating the ion beam 306.

The ion implanter 300 may include an analyzer 310, functioning to analyze the ion beam 306 as in known apparatus, by changing the trajectory of the ion beam 306, as shown. The ion implanter 300 may also include a buncher 312, and a linear accelerator 314 (shown in the dashed line), disposed downstream of the buncher 312, where the linear accelerator 314 is arranged to accelerate the ion beam 306 to form a high energy ion beam 315, greater than the ion energy of the ion beam 306, before entering the linear accelerator 314. The buncher 312 may receive the ion beam 306 as a continuous ion beam and output the ion beam 306 as a bunched ion beam to the linear accelerator 314. The linear accelerator 3314 may include a plurality of acceleration stages (314-A, 314-B, . . . to 314-Z (not shown)), arranged in series, as shown. In various embodiments, the ion energy of the high energy ion beam 315 may represent the final ion energy for the ion beam 306, or approximately the final ion energy. In various embodiments, the ion implanter 300 may include additional components, such as filter magnet 316, a scanner 313, collimator 320, where the general functions of the scanner 313 and collimator 320 are well known and will not be described herein in further detail. As such, a high energy ion beam, represented by the high energy ion beam 315, may be delivered to an end station 322 for processing a substrate 324. Non-limiting energy ranges for the high energy ion beam 315 include 500 keV-10 MeV, where the ion energy of the ion beam 306 is increased in steps through the various acceleration stages of the linear accelerator 314. In accordance with various embodiments of the disclosure, one or more of the acceleration stages of the linear accelerator 314 may include a drift tube assembly, with integrated DC electrode arrangement, as detailed with respect to the embodiments of FIGS. 1-5.

In view of the above, the present disclosure provides at least the following advantages. An advantage provided by an ion implanter incorporating the present DC electrode architecture is that the focusing of the ion beam may take place without the need for external quadrupole structures. In other words, the novel design of the present embodiments allows the focusing and steering of a beam to be done within the length of a drift tube without adding any extra length to the LINAC to achieve these purposes. This result enables the manufacture of a shorter LINAC and hence a more compact high energy ion implanter. One additional advantage of this design is that the size of the DC optics may scale with the ion energy along a LINAC: the shorter drift tubes (near the beginning of the LINAC where the ions are at lower ion energy) just have room for shorter DC focusing optics, but at this point the drift tubes would just need smaller E-field path length integrals because the ions have lower energy. Once the ions have acquired higher energy and require larger field path length integrals, the drift tubes will also be longer and allow for stronger focusing.

While certain embodiments of the disclosure have been described herein, the disclosure is not limited thereto, as the disclosure is as broad in scope as the art will allow and the specification may be read likewise. Therefore, the above descriptions are not to be construed as limiting. Those skilled in the art will envision other modifications within the scope and spirit of the claims appended hereto.

The invention claimed is:

1. An apparatus, comprising:

a drift tube assembly, the drift tube assembly comprising a plurality of drift tubes to conduct an ion beam along a beam propagation direction, the plurality of drift tubes defining a multi-gap configuration corresponding to a plurality of acceleration gaps, wherein at least one powered drift tube of the drift tube assembly is coupled to receive an RF voltage signal; and a DC electrode assembly, comprising:

a conductor line, arranged within a resonator coil that is coupled to receive a DC voltage signal into the at least one powered drift tube; and a DC electrode arrangement, connected to the conductor line and disposed within the at least one powered drift tube.

2. The apparatus of claim 1, wherein the conductor line is coupled to receive the DC voltage from a DC voltage source, wherein a DC electric field is generated within the at least one powered drift tube, between a DC electrode of the DC electrode arrangement, and a wall of the at least one powered drift tube.

3. The apparatus of claim 2, the DC electrode assembly further comprising an RF filter, disposed between the DC voltage source and the DC electrode arrangement.

4. The apparatus of claim 1, wherein the DC electrode arrangement comprises an Einzel lens configuration.

5. The apparatus of claim 1, wherein the DC electrode arrangement comprises a quadrupole configuration.

6. The apparatus of claim 5, wherein the quadrupole configuration comprises:

a pair of DC electrodes, disposed opposite to one another within the at least one powered drift tube, and being coupled to the conductor line; and a pair of protrusions, electrically connected to the at least one powered drift tube.

7. The apparatus of claim 1, wherein the resonator coil comprises a conductive wall arranged to deliver the RF voltage signal to the at least one powered drift tube, and wherein the conductive line is electrically isolated from the conductive wall.

8. A linear accelerator, comprising:

a plurality of acceleration stages, wherein at least one acceleration stage of the plurality of acceleration stages comprises:

a drift tube assembly, to conduct an ion beam along a beam propagation direction;

a resonator coil, the resonator coil comprising a conductive wall that is coupled to deliver an RF voltage to a powered drift tube of the drift tube assembly; and a DC electrode assembly, comprising:

a conductor line, arranged within the resonator coil, and electrically isolated from the resonator coil; and a DC electrode arrangement, connected to the conductor line and disposed within the powered drift tube, and electrically isolated from the powered drift tube.

9. The linear accelerator of claim 8, wherein the conductor line is coupled to receive a DC voltage from a DC voltage source, wherein a DC electric field is generated within the powered drift tube, between a DC electrode of the DC electrode arrangement, and the conductive wall.

10. The linear accelerator of claim 9, the DC electrode assembly further comprising an RF filter, disposed between the DC voltage source and the DC electrode arrangement.

11. The linear accelerator of claim 8, wherein the DC electrode arrangement comprises an Einzel lens configuration.

12. The linear accelerator of claim 8, wherein the DC electrode arrangement comprises a quadrupole configuration.

13. The linear accelerator of claim 12, wherein the quadrupole configuration comprises:

a pair of DC electrodes, disposed opposite to one another within the powered drift tube, and being coupled to the conductor line; and a pair of protrusions, electrically connected to the powered drift tube.

14. An ion implanter, comprising:

an ion source, to generate an ion beam; and a linear accelerator, disposed to receive the ion beam, the linear accelerator comprising:

a plurality of acceleration stages, wherein at least one acceleration stage of the plurality of acceleration stages comprises:

a drift tube assembly, to conduct an ion beam along a beam propagation direction;

a resonator coil, the resonator coil comprising a conductive wall that is coupled to deliver an RF voltage to a powered drift tube of the drift tube assembly; and a DC electrode assembly, comprising:

a conductor line, arranged within the resonator coil, and electrically isolated from the resonator coil; and a DC electrode arrangement, connected to the conductor line and disposed within the powered drift tube, and electrically isolated from the powered drift tube.

15. The ion implanter of claim 14, wherein the conductor line is coupled to receive a DC voltage from a DC voltage source, wherein a DC electric field is generated within the powered drift tube, between a DC electrode of the DC electrode arrangement, and the conductive wall.

16. The ion implanter of claim 15, the DC electrode assembly further comprising an RF filter, disposed between the DC voltage source and the DC electrode arrangement.

17. The ion implanter of claim 14, wherein the DC electrode arrangement comprises an Einzel lens configuration.

18. The ion implanter of claim 14, wherein the DC electrode arrangement comprises a quadrupole configuration.

19. The ion implanter of claim 18, wherein the quadrupole configuration comprises:

a pair of DC electrodes, disposed opposite to one another within the powered drift tube, and being coupled to the conductor line; and a pair of protrusions, electrically connected to the powered drift tube.

* * * * *